United States Patent
Daftardar (10) Patent No.: US 8,332,839 B2
(45) Date of Patent: Dec. 11, 2012

(54) METHOD AND SYSTEM FOR MODIFYING FIRMWARE IMAGE SETTINGS WITHIN DATA STORAGE DEVICE CONTROLLERS

(75) Inventor: Jayant Mohan Daftardar, Lawrenceville, GA (US)

(73) Assignee: LSI Corporation, Milpitas, CA (US)

( * ) Notice: Subject to any disclaimer, the term of this patent is extended or adjusted under 35 U.S.C. 154(b) by 1150 days.

(21) Appl. No.: 12/192,444

(22) Filed: Aug. 15, 2008

(65) Prior Publication Data
US 2010/0042984 A1 Feb. 18, 2010

(51) Int. Cl.
G06F 9/44 (2006.01)
G06F 17/30 (2006.01)
(52) U.S. Cl. ......................................... 717/173; 707/824
(58) Field of Classification Search .................... 717/168
See application file for complete search history.

(56) References Cited

U.S. PATENT DOCUMENTS

| | | | |
|---|---|---|---|
| 6,425,125 B1 * | 7/2002 | Fries et al. | 717/168 |
| 6,995,769 B2 * | 2/2006 | Ordentlich et al. | 345/520 |
| 7,676,800 B2 * | 3/2010 | Kinney | 717/162 |
| 7,721,000 B2 * | 5/2010 | Kim | 709/247 |
| 7,865,479 B2 * | 1/2011 | Gu et al. | 707/693 |
| 2003/0233646 A1 * | 12/2003 | Cohen et al. | 717/174 |
| 2007/0005795 A1 * | 1/2007 | Gonzalez | 709/232 |
| 2008/0028368 A1 * | 1/2008 | Depew et al. | 717/120 |
| 2008/0250403 A1 * | 10/2008 | Moon et al. | 717/169 |
| 2009/0254897 A1 * | 10/2009 | Segalov | 717/173 |
| 2010/0313194 A1 * | 12/2010 | Juneja | 717/171 |

* cited by examiner

*Primary Examiner* — Don Wong
*Assistant Examiner* — Mohammad Kabir (57) ABSTRACT

Embodiments of the invention include a method for modifying firmware settings within a data storage controller, such as a data storage controller used in a Redundant Array of Inexpensive Disks (RAID) storage array. The method includes extracting a sub-module from a firmware image stored in the controller, stripping off the sub-module's header, decompressing the remaining compressed image by replacing the stripped sub-module header and an extended image header in the compressed image with an extended header image that allows conventional decompression, and separating the decompressed image into its executable code and at least one settings group. The method reinitializes the executable code to restore its validity, modifies one or more values of one or more settings groups, creates a new sub-module using the reinitialized executable code and the modified settings groups, and replaces the original settings groups in the firmware image with the modified settings groups, thereby modifying the firmware settings of the data storage controller.

20 Claims, 4 Drawing Sheets

METHOD AND SYSTEM FOR MODIFYING FIRMWARE IMAGE SETTINGS WITHIN DATA STORAGE DEVICE CONTROLLERS

BACKGROUND OF THE INVENTION

1. Field of the Invention

The invention relates to the data storage devices, such as RAID storage arrays. More particularly, the invention relates to controllers, such as RAID controllers, used with data storage arrays.

2. Description of the Related Art

A storage array or disk array is a data storage device that includes multiple disk drives or similar persistent storage units. A storage array can allow relatively large amounts of data to be stored in an efficient manner. A storage array also can provide redundancy to promote reliability, as in the case of a Redundant Array of Inexpensive Disks (RAID) storage array. A storage array commonly also includes a suitable enclosure, power supply, one or more controllers (typically in the form of one or more circuit boards), and interfaces to connect the storage array to an external host, such as a computer or network device. The controller, such as a RAID controller, includes the intelligence or logic (i.e., a client) that causes the storage array to read or write data to or from its persistent storage in response to requests received from an external host.

Various RAID controllers are deployed in a wide variety data storage device brands. These controllers are programmed with read-only memory (ROM) images that contain various firmware. These ROM images or firmware images include various sub-modules that are executed by various hardware parts during operation of the RAID controller. For example, such sub-modules can include a boot loader sub-module, a configuration sub-module, a RAID firmware code sub-module, and a Serial Attached SCSI (SAS) chip firmware code sub-module. Each firmware sub-module typically includes executable code, an associated header, and one or more additional images of non-volatile data (NVDATA). This non-volatile data contains various critical parameters that define the way the hardware behaves, and includes various parameters of interest, such as drive strengths and slew rates of Physical Layer (PHY) signals. These values, in turn, are programmed into one or more configuration registers of the particular firmware code sub-module.

Whenever RAID controller firmware is released, the firmware includes standard settings of NVDATA values and other groups of settings that are tested for the appropriate host based adapter controller. When original equipment manufacturer (OEM) customers use this firmware on their particular platforms, e.g., RAID On Mother Board (ROMB) platforms, the firmware often does not perform as well as the firmware could because NVDATA values and other groups of settings often need to be reconfigured or adjusted as per the track layout on the motherboard or elsewhere on the platform. For example, RAID controller firmware often needs to be reconfigured based upon the particular hardware design of the controller.

Various groups of settings, including NVDATA values, are relatively sensitive to the track layout and track length on the controller circuit board, and can vary from one hardware configuration to another hardware configuration. Proper signal analysis (e.g., "eye-diagram" analysis) using highly sophisticated instrumentation usually is the only way that these values can be determined for the particular hardware configuration. Therefore, each released version of RAID controller firmware typically needs to be modified with appropriate group settings values, such as appropriate NVDATA values.

Conventional methods for addressing this modification issue typically involve rebuilding the entire RAID controller firmware image using the changed NVDATA values. However, such a rebuilding process involves checking-out and checking-in source files, and creating new child streams if the RAID controller firmware version has changed. The rebuilding process also involves building the new sub-module and then concatenating this sub-module with other sub-modules to build the entire firmware image. This rebuilding process not only involves unnecessary time-consuming steps, but also introduces certain administrative overhead for tracking individual source files.

SUMMARY OF THE INVENTION

The invention is embodied in a method and apparatus for modifying firmware settings within a data storage controller, such as a data storage controller used in a Redundant Array of Inexpensive Disks (RAID) storage array. The method includes extracting one or more sub-modules from a firmware image that is stored in the data storage controller, stripping off the sub-module's header, decompressing the remaining compressed image by replacing the stripped sub-module header and an extended image header stored in the compressed image with an extended header image that allows conventional decompression, and separating the decompressed image into its executable code and its at least one settings group. The method also reinitializes the executable code to restore its validity, modifies one or more values of one or more settings groups, creates a new sub-module using the reinitialized executable code and the modified settings groups, and replaces the original settings groups in the firmware image with the modified settings groups, thereby modifying the firmware settings of the data storage controller. Using this method, the firmware settings of the data storage controller can be modified without having to rebuild the entire controller firmware image, as is required conventionally.

DETAILED DESCRIPTION OF EXEMPLARY EMBODIMENTS

In the following description, like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

The methods and systems according to embodiments of the invention allow one or more groups of settings within one or more sub-modules within a firmware image of a data storage controller to be modified for testing and use on different hardware platforms, without the modification involving relatively cumbersome rebuilding processes, as is required conventionally. The modification method includes extracting one or more sub-modules from a firmware image that is stored in the data storage controller, stripping off the sub-module's header, decompressing the remaining compressed image using an extended image that will allow the compressed image to be decompressed using a conventional decompression process, and separating the decompressed image into its executable code and its at least one settings group. The method also includes reinitializing the executable code to restore its validity, modifying one or more values of one or more settings groups, creating a new sub-module using the reinitialized executable code and the modified settings groups, and replacing the original settings groups in the firmware image with the modified settings groups, thereby modifying the firmware settings of the data storage controller.

Figure 1:
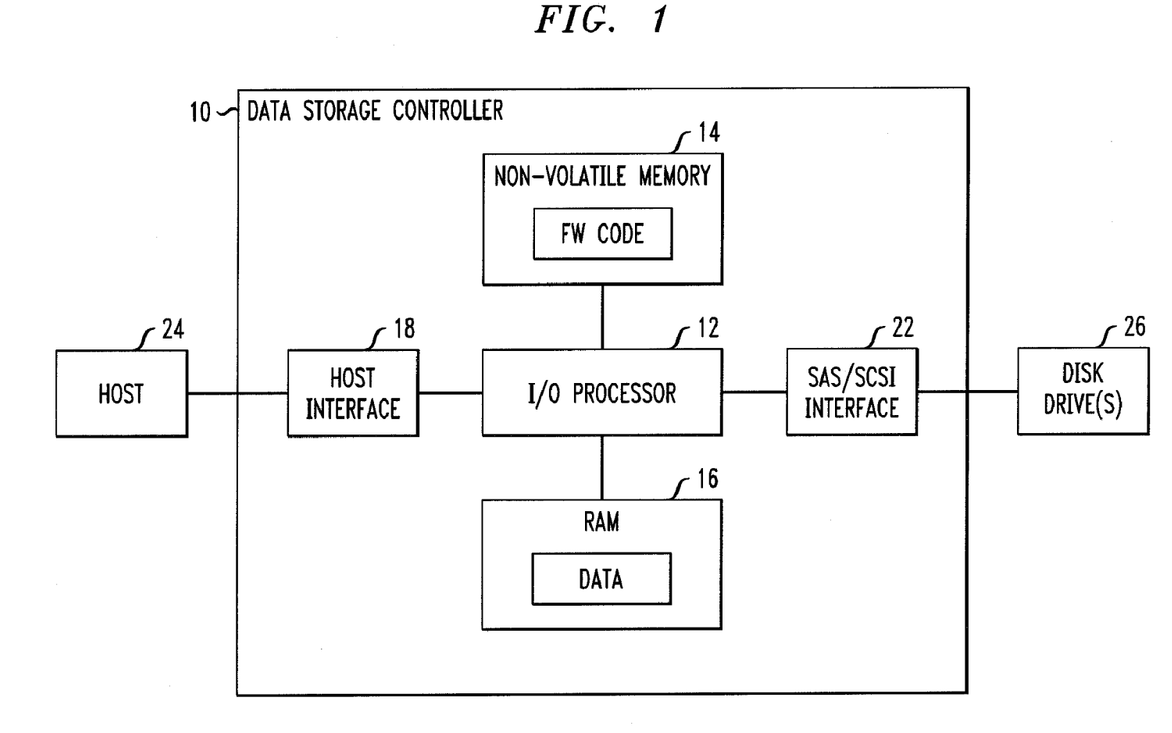
FIG. 1 is a schematic view of a data storage controller apparatus according to embodiments of the invention.

Referring now to FIG. 1, shown is a schematic view of a data storage controller or controller apparatus 10 according to embodiments of the invention. The data storage controller 10 manages the operation of an associated data storage device, including reading data from and writing data to the data storage device, which can be a storage array, such as a Redundant Array of Inexpensive Disks (RAID) storage array. For example, the data storage controller 10 processes requests from a host system attached thereto into appropriate requests to the data storage device.

The data storage controller 10 includes an input/output (I/O) processor 12, a non-volatile memory element 14 typically having firmware code programmed therein, a random access memory (RAM) element 16 typically having various data at least temporarily stored therein, a front-end or host interface 18, and one or more back-end or data storage device interfaces 22, such as a Serial Attached SCSI (SAS)/SCSI interface. The host interface 18, which interfaces with a host system 24, allows communication between the data storage controller 10 and the host system 24. The SAS/SCSI interface 22, which interfaces with one or more disk drives 26 or other data storage device, such as a RAID storage array, allows data communication between the data storage controller 10 and the disk drives 26.

The data storage controller 10 can include any suitable conventional elements, such as microprocessors, memory and hard-wired logic, that in accordance with suitable programming or configuration logic allow the data storage controller 10 to effect the functions or methods described herein, as well as any other suitable functions that persons skilled in the art understand are characteristic of conventional data storage controllers. Such programming logic can be stored in the form of software or firmware that has been loaded into memory for execution by one or more processors, either on an as-needed or random-access basis or as firmware stored in non-volatile memory (e.g., programmable read-only memory).

One or more of the components within the data storage controller 10, including the input/output (I/O) processor 12, the non-volatile memory element 14, the random access memory (RAM) element 16, the host interface 18, and the back-end interfaces 22, can be comprised partially or completely of any suitable structure or arrangement, e.g., one or more integrated circuits. Also, it should be understood that the data storage controller 10 includes other components, hardware and software (not shown) that are used for the operation of other features and functions of the data storage controller 10 not specifically described herein.

The data storage controller 10 can be partially or completely configured in the form of hardware circuitry and/or other hardware components within a larger device or group of components. Alternatively, the data storage controller 10 can be partially or completely configured in the form of software, e.g., as processing instructions and/or one or more sets of logic or computer code. In such configuration, the logic or processing instructions typically are stored in a data storage device (not shown). The data storage device typically is coupled to a processor, such as the I/O processor 12. The processor accesses the necessary instructions from the data storage device and executes the instructions or transfers the instructions to an appropriate location within the data storage controller 10.

As discussed hereinabove, the data storage controller 10 typically is programmed with read-only memory (ROM) images that contain various firmware, e.g., one or more firmware images, such as a RAID firmware image. These firmware images include various sub-modules that are executed by various hardware portions of the data storage controller during the operation of the data storage controller 10.

Figure 2:
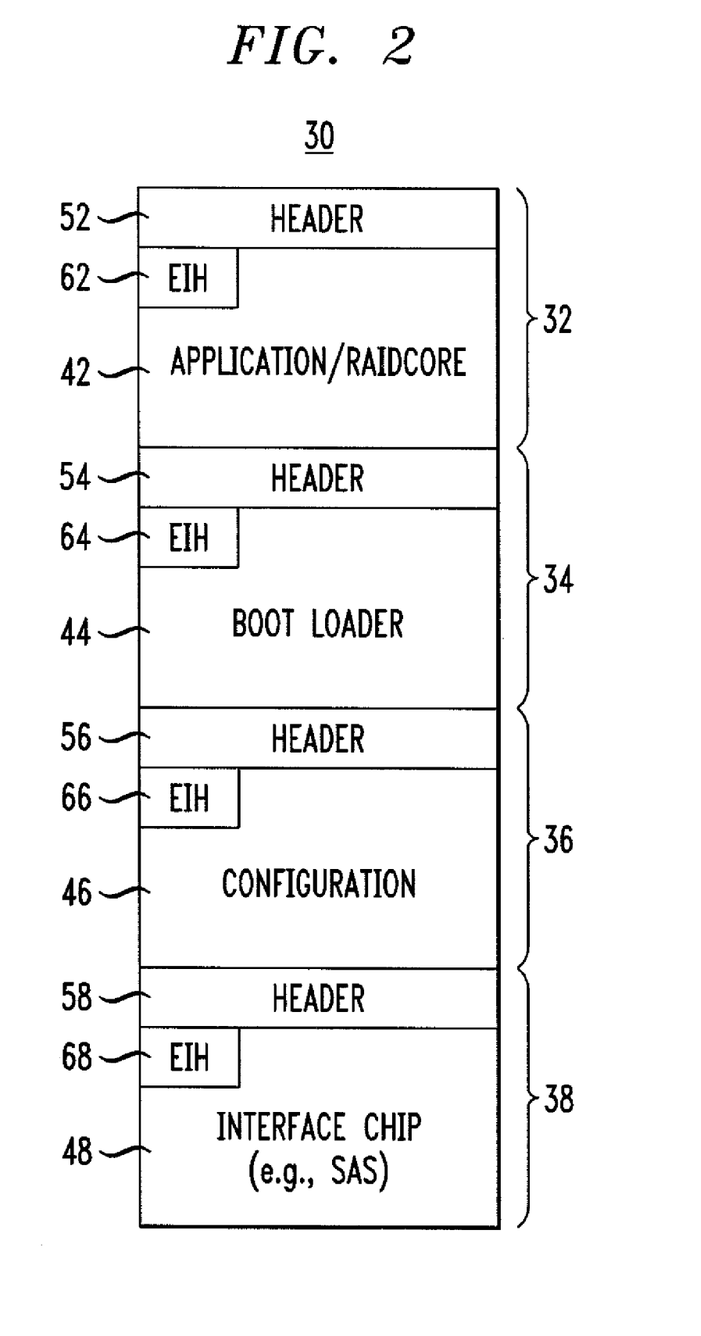
FIG. 2 is a schematic view of a firmware image, such as a RAID firmware image, that can be included within the data storage controller apparatus according to embodiments of the invention.

Referring now to FIG. 2, shown is a schematic view of a firmware image 30, such as a RAID firmware image. The firmware image 30 typically is programmed within the non-volatile element 14 of the data storage controller 10. The firmware image 30 includes one or more firmware sub-modules, each of which can be any one of a plurality of sub-module types, such as an application/RAIDcore sub-module 32, a boot loader sub-module 34, a configuration sub-module 36, and an interface chip sub-module 38. It should be understood that the firmware image 30 also can include other sub-modules and sub-module types.

As will be discussed in greater detail hereinbelow, each firmware sub-module includes a compressed image and an associated (sub-module) header. For example, the application/RAIDcore sub-module 32 includes a compressed application/RAIDcore image 42 and an associated header 52. The boot loader sub-module 34 includes a compressed boot loader image 44 and an associated header 54. The configuration sub-module 36 includes a compressed configuration image 46 and an associated header 56. The interface chip sub-module 38 includes a compressed interface chip image 48 and an associated header 58. As will be discussed in greater detail hereinbelow, each compressed image within a given sub-module includes executable code and one or more additional images of group settings, which typically include non-volatile data (NVDATA) values and other parameter settings. The header associated with each firmware sub-module typically includes various information about the particular associated sub-module image, such as the length of the sub-module image, the sub-module image type, and the processor or processor segment used to access and run the particular code within the sub-module image. Therefore, the content of the headers is different for each sub-module.

According to embodiments of the invention, as will be discussed in greater detail hereinbelow, each firmware sub-module also includes an extended image header (EIH), included as part of the compressed image. For example, the compressed application/RAIDcore image 42 includes an extended image header 62, the compressed boot loader image 44 includes an extended image header 64, the compressed configuration image 46 includes an extended image header 66, and the compressed interface chip image 48 includes an extended image header 68. The extended image header in the particular firmware sub-module includes sub-module specific information, and thus the content of the extended image header is different for each sub-module. Also, during the process involved in building the firmware sub-modules, the extended image header in the particular sub-module replaced a compression tool specific generated header that may or may not be used subsequently to assist in decompressing the sub-module's compressed image, as will be discussed in greater detail hereinbelow.

Figure 3:
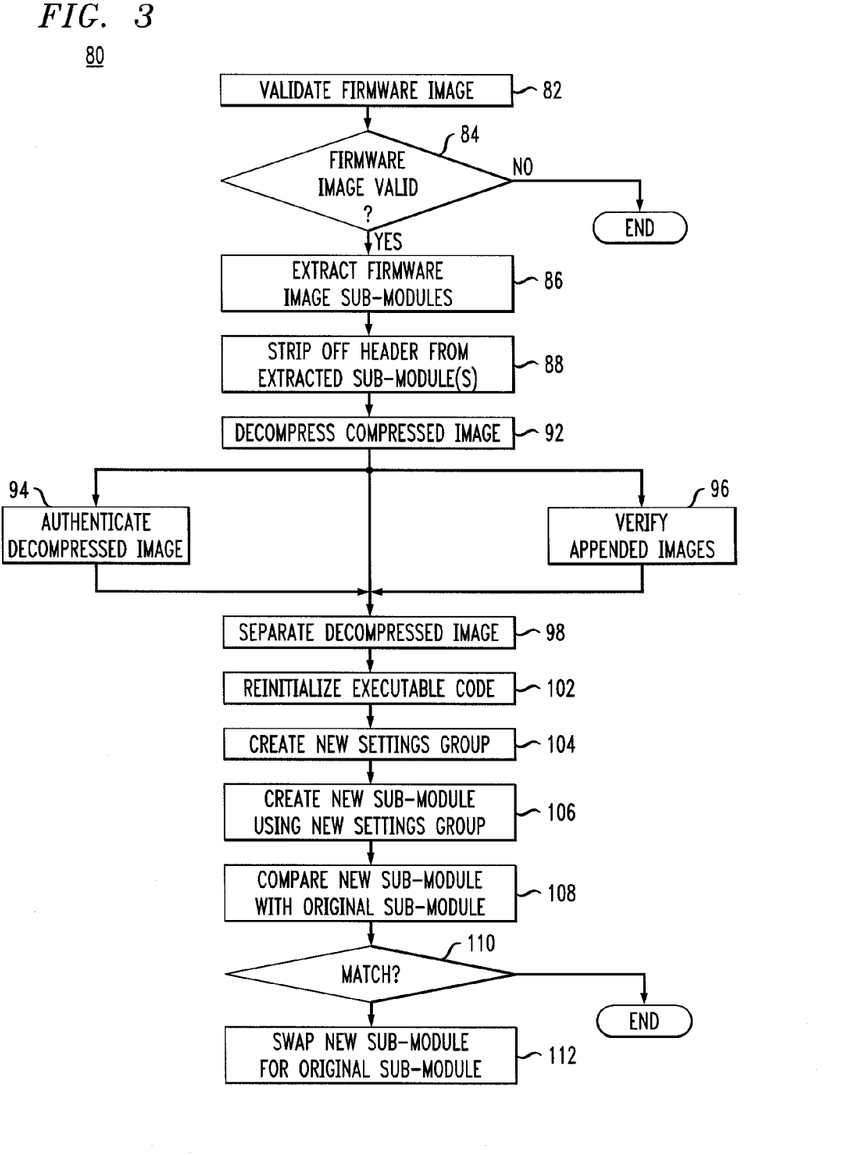
FIG. 3 is a block diagram of a method for modifying a group of settings within a firmware image sub-module according to embodiments of the invention.

Referring now to FIG. 3, with continuing reference to FIG. 1 and FIG. 2, shown is a block diagram of a method 80 for modifying a group of settings within a firmware image sub-module according to embodiments of the invention. It should be understood that the method 80 can be performed partially or completely within the data storage controller 10, e.g., by the I/O processor 12 and/or other suitable components within the data storage controller 10.

The method 80 includes a step 82 of validating the firmware image 30. The validating step 82 can validate the firmware image 30 in any suitable manner, e.g., by checking the sub-module names and the target names embedded in the each sub-module header. The validating step 82 also can validate the firmware image 30 by computing the checksum of the firmware image 30 and comparing the computed checksum value with the checksum value stored within the firmware image 30.

Accordingly, the method 80 performs a decision step 84 of determining whether the firmware image 30 is valid. If the firmware image 30 is not valid (N), the method 80 ends. If the firmware image 30 is valid (Y), the method 80 continues and performs a step 86 of extracting one or more sub-modules from the firmware image 30.

Figure 4:
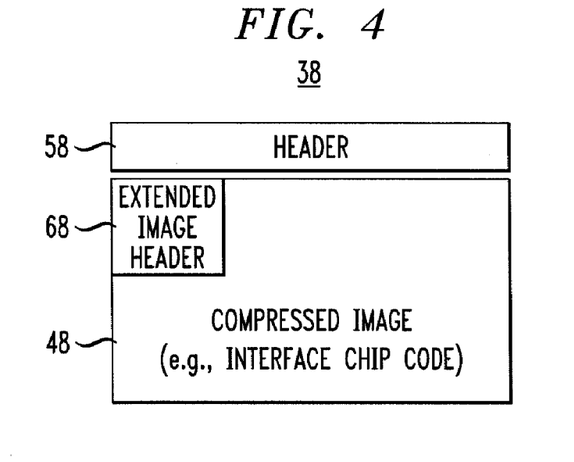
FIG. 4 is a schematic view of an extracted firmware image sub-module extracted from a firmware image using methods according to embodiments of the invention.

For example, referring now to FIG. 4, with continuing reference to FIG. 3, shown is a schematic view of a sub-module, e.g., the interface chip sub-module 38, after being extracted from the firmware image 30. It should be understood that the extracting step 86 can extract one or more (or all) sub-modules from the firmware image 30, e.g., the application/RAIDcore sub-module 32, the boot loader sub-module 34, the configuration sub-module 36 and/or the interface chip sub-module 38. Typically, according to embodiments of the invention, the extracting step 86 extracts the sub-module or sub-modules whose settings are to be modified. As shown, the extracted sub-module 38 includes the sub-module header 58 and the compressed interface chip image 48, which can include interface chip code, such as SAS code. As discussed hereinabove, the compressed interface chip image 48 includes the extended image header 68 associated therewith.

The method 80 includes a step 88 of stripping off the sub-module header from the extracted sub-module. For example, using the interface chip sub-module 38 shown in FIG. 4 as an example, the header stripping step 88 strips off or separates the header 58 from the compressed interface chip image 48. The header can be removed or separated from the compressed interface chip image in any suitable manner using any suitable firmware processing techniques.

The method 80 includes a step 92 of decompressing the remaining compressed image, e.g., using a suitable decompression algorithm. Because the compression tool specific generated header has been stripped off or separated from the compressed image, most conventional decompression algorithm and processing techniques are incapable of successfully decompressing the remaining compressed image without a header. However, according to embodiments of the invention, the extended image header stored in the compressed image is removed from the compressed image and replaced with a decompression-enabling extended image header that will allow decompression of the compressed image using conventional decompression processes. For example, the decompression-enabling extended image header can include a constant data pattern that mimics what the compressed image's compression algorithm created or might have created during the initial compression of the compressed image, i.e., during the initial formation of the firmware image. Therefore, according to embodiments of the invention, the use of the decompression-enabling extended image header allows the compressed image to be properly decompressed using a suitable decompression algorithm when the stripped-off sub-module header is replaced by the extended image header.

Figure 5:
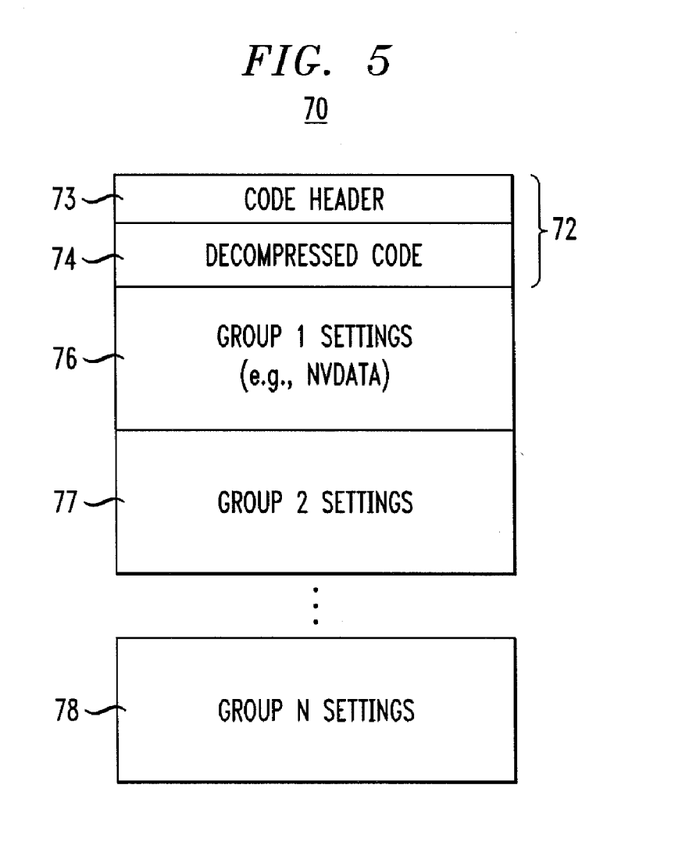
FIG. 5 is a schematic view of a decompressed image decompressed from a firmware image sub-module extracted from a firmware image using methods according to embodiments of the invention.

Referring now to FIG. 5, with continuing reference to FIG. 3, shown is a schematic view of a decompressed image 70 decompressed from the compressed image portion of a firmware image sub-module that was extracted from a firmware image using the decompression step 92. For example, a compressed image, e.g., the compressed image 48 shown in FIG. 4, is decompressed into an executable code portion 72 and one or more appended groups of settings, such as a first group of settings 76, a second group of settings 77, and continuing to an nth group of settings 78. The executable code portion 72 includes a code header 73 and a decompressed code portion 74.

Referring again to FIG. 3, with continuing reference to FIG. 5, the method 80 can include a step 94 of authenticating or verifying the decompressed image 70. Once the decompression step 92 has decompressed the compressed image, the resulting decompressed image 70 can be authenticated (verified), although such step is not necessary. The authentication step 94 can authenticate the decompressed image 70 in any suitable manner, e.g., by checking the signature information in the code header 73 and/or by comparing the size of the individual images to the total image size. For example, the decompressed image 70 can be authenticated by collectively comparing the individual images, i.e., the one or more groups of settings 76-78, with the total image size, which information typically is included in the code header 73 or other appropriate location.

Also, the method 80 can include a step 96 of verifying one or more of the individual groups of settings 76-78 by checking the image type. The image type information typically is included within the code header 73. Accordingly, one or more of the groups of settings 76-78 can be verified by checking its respective image type based on the image type information included in the associated code header 73 or other appropriate location.

The method 80 includes a step 98 of splitting or separating the decompressed image 70, e.g., by separating the one or more settings groups 76-78 from the executable code 72. The separation step 98 can be performed in any suitable manner, e.g., by one or more suitable components within the data storage controller 10.

The resulting decompressed image, i.e., the executable code 72, which at this point is in a truncated form, now is invalid as a proper decompressed image. For example, the header information included in the code header 73, now is invalid or improper with regard to the size, length, checksum and type of the decompressed image 70, because the settings groups 76-78 no longer are a part of the decompressed image. That is, the separation or removal of the settings group images 76-78 from the decompressed image has changed the size, length and type of the decompressed image, which at this point includes only the code header 73 and the decompressed code 74. Thus, the header information within the code header 73 no longer is accurate or valid for the decompressed image without the previously appended settings group images 76-78.

The method 80 includes a step 102 of reinitializing the executable code 72. Because the decompressed image, at this point, is invalid, the decompressed image has to be reconstructed as a valid image. The reinitializing step 102 "stitches" the executable code 72 (without the settings group images 76-78) to make the decompressed image valid again. For example, the reinitializing step 102 reinitializes the image size and recomputes the checksum in the header of the reconstructed image. As a result of the reinitializing step 102, the decompressed image is reconstructed as a valid image.

The method includes a step 104 of creating a new settings group. As discussed hereinabove, the original settings groups within the firmware include standard settings, e.g., NVDATA values and other group settings, that have been tested for the appropriate host based adapter controller. However, depending on the various platforms (e.g., track layout) in which the firmware is used, various NVDATA values and other settings within one or more settings groups may have to be modified to make the firmware perform better in the particular platform. The step 104 of creating a new setting group involves modifying one or more settings values within one or more settings groups, as needed, for improved performance of the firmware within a given platform. For example, the step 104 can involve adjusting one or more NVDATA values within the first settings group 76. It should be understood that the original version of the settings group(s) being modified (i.e., the standard settings) can be saved for appropriate purposes, such as subsequent testing and other purposes not necessarily directly related to the method 80 and embodiments of the invention.

The method includes a step 106 of creating a new sub-module using the new settings group(s). Once the new settings group or groups has been created, the new settings group(s) and the remaining unchanged settings groups can be concatenated to the reinitialized executable code 72 and a new header added to form a new decompressed image. For example, if one or more NVDATA values within the first settings group 76 has been modified as a result of the new settings group creating step 104, the new sub-module creating step 106 would involve concatenating the modified first settings group 76 and the original remaining settings groups (i.e., the original second settings group 77 and the original nth settings group 78) to the reinitialized executable code 72. The new settings groups and the remaining unchanged settings groups can be concatenated or appended to the reinitialized executable code 72 in any suitable manner, e.g., using conventional build processes. Also, the new header can be added in any suitable manner, e.g., using conventional build processes.

The new sub-module creating step 106 also includes compressing the new decompressed image to form a new sub-module. The new decompressed image can be compressed in any suitable manner, e.g., using any suitable compression process, to form the new sub-module. In this manner, the new sub-module includes a compressed image with at least one settings group having modified settings values therein.

The method 80 includes a step 108 of comparing the new (modified) sub-module with the original version of the same sub-module, i.e., the version of the sub-module originally included within the firmware image 30. The comparing step 108 can compare the new sub-module with its original version in any suitable manner. For example, the comparing step 108 can compare the size, the image type and/or the checksum of the new sub-module to that of the original version of the sub-module.

Accordingly, the method 80 performs a decision step 110 of determining whether the new sub-module matches or compares favorably to the original version of the sub-module. If the new sub-module matches or compares favorably with the original version of the sub-module (Y), the method 80 performs a step 112 of swapping or replacing the original version of the sub-module in the firmware image 30 with the new sub-module. That is, the original version of the sub-module is extracted from the firmware image 30 and replaced with the new (modified) sub-module. If the new sub-module does not match or does not compare favorably with the original version of the sub-module (N), the method 80 ends without the new sub-module replacing the original version of the sub-module in the firmware image 30.

According to embodiments of the invention, NVDATA values and other settings within one or more settings groups can be modified within a controller firmware image without having to rebuild the entire controller firmware image. In this manner, the original configuration of a firmware image can be modified to enhance its performance across various platforms that can have different track layouts and other configuration variables.

The method shown in FIG. 3 may be implemented in a general, multi-purpose or single purpose processor, such as the I/O processor 12 in the data storage controller 10 of FIG. 1. Such a processor will execute instructions, either at the assembly, compiled or machine-level, to perform that process. Those instructions can be written by one of ordinary skill in the art following the description of FIG. 3 and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the embodiments of the invention herein described without departing from the spirit and scope of the invention as defined by the appended claims and their full scope of equivalents.

The invention claimed is:

1. A method for modifying firmware settings within a data storage controller, wherein the data storage controller has stored therein at least one firmware image that includes a plurality of sub-modules, and wherein each sub-module includes a sub-module header and a compressed image, the method comprising the steps of:

extracting at least one of the sub-modules from the firmware image;

stripping the sub-module header from the extracted sub-module;

decompressing the compressed image of the extracted sub-module, using a decompression-enabling extended image header, to generate a decompressed image, wherein the decompressed image includes executable code including a code header and at least one settings group having at least one settings group value therein;

separating the executable code and the at least one settings group;

reinitializing the executable code in such a way that the executable code becomes a valid image;

modifying at least one value of at least one settings group to form a modified version of the original settings group;

creating a modified sub-module using the reinitialized executable code and the modified version of the original settings group by concatenating the modified version of the original settings group to the reinitialized executable code to form a new decompressed image and compressing the new decompressed image to form the modified sub-module; and inserting the modified version of the original settings group into the firmware image in such a way that the original settings group extracted from the firmware image is replaced by the modified version of the original settings group to form a modified firmware image, wherein the modified firmware image represents a modification of the firmware settings within the data storage controller.

2. The method as recited in claim 1, wherein the sub-module includes an extended image header, and wherein the decompressing step includes replacing the extended image header from the compressed image with the decompression-enabling extended image header.

3. The method as recited in claim 1, wherein the modified sub-module creating step includes appending the modified version of the original settings group to the reinitialized executable code and adding a header to form a modified decompressed image, and compressing the modified decompressed image to form the modified sub-module.

4. The method as recited in claim 1, further comprising the step of comparing the modified version of the settings group to the original settings group.

5. The method as recited in claim 4, wherein the comparing step includes at least one of comparing the size of the modified version of the settings group to the size of the original settings group, comparing the image type of the modified version of the settings group to the image type of the original settings group, and validating a computed checksum of the modified version of the settings group and the checksum of the original settings group.

6. The method as recited in claim 1, further comprising the step of verifying the decompressed image, wherein the verifying step includes at least one of reading a header signature in the code header, comparing the size of the at least one settings groups with a total size value of the at least one settings groups, and comparing the type of the at least one settings groups with image type information in the code header.

7. The method as recited in claim 1, further comprising, before the extracting step, the step of validating the firmware image, wherein the validating step includes at least one of comparing a sub-module name with a target sub-module name embedded in the sub-module header, and comparing a computed checksum of the firmware image with a checksum value stored in the firmware image.

8. The method as recited in claim 1, wherein extracting step includes extracting the sub-modules by sub-module type.

9. The method as recited in claim 1, wherein at least one of the sub-modules is an interface chip sub-module, and the compressed image within the interface chip sub-module includes interface chip code.

10. A data storage controller device, comprising:

an interface configured to couple the data storage controller device to at least one data storage device; and a controller coupled to the interface and configured to read data from and write data to the at least one data storage device, wherein the controller has stored therein at least one firmware image that includes a plurality of sub-modules, wherein each sub-module includes a sub-module header and a compressed image, and wherein the compressed image includes an extended image header therein, wherein the controller is configured to extract at least one of the sub-modules from the firmware image, strip the sub-module header from the extracted sub-module, decompress the compressed image of the extracted sub-module, using a decompression-enabling extended image header, to generate a decompressed image, wherein the decompressed image includes executable code including a code header and at least one settings group having at least one settings group value therein, separate the executable code and the at least one settings group, reinitialize the executable code in such a way that the executable code becomes a valid image, modify at least one value of at least one settings group to form a modified version of the original settings group, create a modified sub-module using the reinitialized executable code and the modified version of the original settings group by concatenating the modified version of the original settings group to the reinitialized executable code to form a new decompressed image and compressing the new decompressed image to form the modified sub-module, and insert the modified version of the original settings group into the firmware image in such a way that the original settings group extracted from the firmware image is replaced by the modified version of the original settings group to form a modified firmware image, wherein the modified firmware image represents a modification of the firmware settings within the data storage controller.

11. The device as recited in claim 10, wherein the sub-module includes an extended image header, and wherein the controller is configured to decompress the compressed image of the extracted sub-module by replacing the extended image header from the compressed image with the decompression-enabling extended image header.

12. The device as recited in claim 10, wherein the controller is configured to create the modified sub-module by appending the modified version of the original settings group to the reinitialized executable code and adding a header to form a modified decompressed image, and compressing the modified decompressed image to form the modified sub-module.

13. The device as recited in claim 10, wherein the controller is further configured to compare the modified version of the settings group to the original settings group.

14. The device as recited in claim 13, wherein the controller is configured to compare the modified version of the settings group to the original settings group by comparing the size of the modified version of the settings group to the size of the original settings group, comparing the image type of the modified version of the settings group to the image type of the original settings group, and validating a computed checksum of the modified version of the settings group and the checksum of the original settings group.

15. The device as recited in claim 10, wherein the controller is further configured to verify the decompressed image by reading a header signature in the code header, comparing the size of the at least one settings groups with a total size value of the at least one settings groups, and comparing the type of the at least one settings groups with image type information in the code header.

16. The device as recited in claim 10, wherein the controller is further configured to validate the firmware image.

17. The device as recited in claim 16, wherein the controller is further configured to validate the firmware image by comparing a sub-module name with a target sub-module name embedded in the sub-module header, and comparing a computed checksum of the firmware image with a checksum value stored in the firmware image.

18. The device as recited in claim 10, wherein the controller is configured to extract at least one of the sub-modules from the firmware image by sub-module type.

19. A computer readable medium storing instructions that carry out a method for modifying firmware settings within a data storage controller, wherein the data storage controller has stored therein at least one firmware image that includes a plurality of sub-modules, wherein each sub-module includes a sub-module header and a compressed image, and wherein the compressed image includes an extended image header therein, the computer readable medium comprising:

instructions for extracting at least one of the sub-modules from the firmware image;

instructions for stripping the sub-module header from the extracted sub-module;

instructions for decompressing the compressed image of the extracted sub-module, using a decompression-enabling extended image header, to generate a decompressed image, wherein the decompressed image includes executable code including a code header and at least one settings group having at least one settings group value therein;

instructions for separating the executable code and the at least one settings group;

instructions for reinitializing the executable code in such a way that the executable code becomes a valid image;

instructions for modifying at least one value of at least one settings group to form a modified version of the original settings group;

instructions for creating a modified sub-module using the reinitialized executable code and the modified version of the original settings group by concatenating the modified version of the original settings group to the reinitialized executable code to form a new decompressed image and compressing the new decompressed image to form the modified sub-module; and instructions for inserting the modified version of the original settings group into the firmware image in such a way that the original settings group extracted from the firmware image is replaced by the modified version of the original settings group to form a modified firmware image, wherein the modified firmware image represents a modification of the firmware settings within the data storage controller.

20. The computer readable medium as recited in claim 19, wherein the sub-module includes an extended image header, and wherein the instructions for decompressing the compressed image of the extracted sub-module includes instructions for replacing the extended image header from the compressed image with the decompression-enabling extended image header.

* * * * *